Oct. 4, 1955 R. H. BALZER ET AL 2,719,520
INTERNAL COMBUSTION ENGINE FUEL VAPORIZER
Filed Jan. 28, 1952
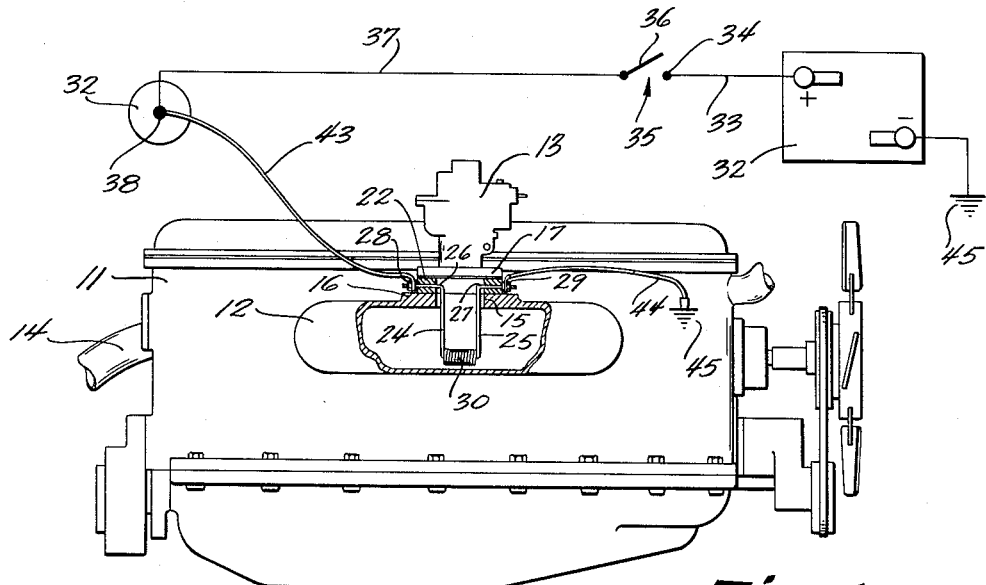
Fig. 1
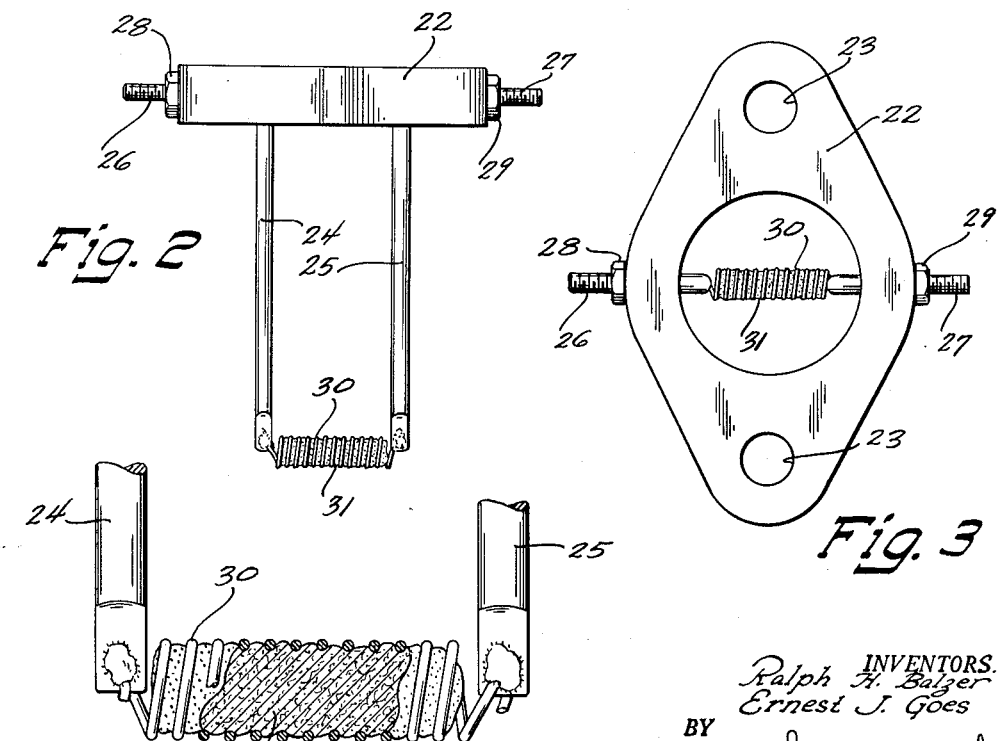
Fig. 2
Fig. 3
Fig. 4
INVENTORS.
Ralph H. Balzer &
Ernest J. Goes
BY
April M. Hajewski
Attorney

United States Patent Office 2,719,520
Patented Oct. 4, 1955

2,719,520

INTERNAL COMBUSTION ENGINE FUEL VAPORIZER

Ralph H. Balzer and Ernest J. Goes, Milwaukee, Wis.

Application January 28, 1952, Serial No. 268,574

7 Claims. (Cl. 123—122)

This invention relates generally to a fuel vaporizer for internal combustion engines, and more particularly to an improved electrically operated fuel vaporizer for facilitating the starting of internal combustion engines which are exposed to low temperatures.

In internal combustion engines and particularly those using gasoline for fuel, the fuel is fed into a carburetor where it is mixed with air in the proper proportions and atomized, the resulting mixture being sprayed into the intake manifold for suction into the cylinders of the engine. Under ordinary conditions, the atomized gasoline will readily vaporize, and the vapor is sucked into the cylinders where it is ignited to produce an explosion for driving the engine. However, when the engine is inoperative in relatively low temperatures, the conditions within the intake manifold are not conducive to vaporization, and it has been found that under these circumstances a pool of gasoline forms on the floor of the manifold, since there is insufficient heat available to produce vaporization. Any gasoline drawn into the cylinders is in the liquid state, which may burn, but will not produce the explosion necessary for actuating the pistons. When this occurs, the engine will fail to start until somehow sufficient heat is produced for effecting vaporization of the fuel.

It is therefore a general object of the present invention to provide an improved apparatus for inducing vaporization of the fuel within an internal combustion engine.

Another object of the present invention is to provide an improved fuel vaporizer especially adaptable for assisting the starting of internal combustion engines subjected to relatively low temperatures.

Another object is to provide an improved fuel vaporizer for gasoline operated internal combustion engines, located in the intake manifold in a position near the floor of the manifold where it will be most effective for producing vaporization of the fuel introduced by the carburetor.

Another object is to provide an electric heating element in the intake manifold of an internal combustion engine for effecting vaporization of the fuel, operable in conjunction with an electric starting motor so that it is energized automatically upon operation of the starting motor.

A further object is to provide an improved fuel vaporizer for internal combustion engines which is efficient in operation, but of simple and inexpensive construction.

According to this invention there is provided an improved fuel vaporizer for assisting vaporization of the fuel in the intake manifold of a gasoline engine, which is especially adaptable for utilization in gasoline operated automobile engines equipped with an electric starting motor for starting the engine. The vaporizer comprises an electric heating element supported by a pair of electrodes at a point not more than one-quarter of an inch from the floor of the intake manifold. The electrodes depend from a collar disposed under the mounting flange of the carburetor so that it is secured between the carburetor and engine by the carburetor mounting bolts. One of the electrodes is connected to a ground, and the other is connected in the electric starting motor circuit so that when the starting motor switch is closed the electrical circuit to the heating element is also closed for energizing the element. The heat thus produced in the area underneath the carburetor, at the floor of the intake manifold, serves to vaporize the liquid fuel introduced by the carburetor for suction into the engine cylinders.

The foregoing and other objects of the invention, which will become apparent from the following detailed specification setting forth an illustrative embodiment, may be achieved by the particular apparatus depicted in and described in connection with the accompanying drawings, in which:

Figure 1 is a view in side elevation of a gasoline engine embodying the present invention, with parts broken away to illustrate the installation of the invention in the intake manifold of the engine, and its electrical wiring circuit being depicted diagrammatically;

Figure 2 is a view in side elevation of the fuel vaporizer comprising the present invention;

Figure 3 is a plan view of the fuel vaporizer illustrated in Figure 2; and

Figure 4 is an enlarged fragmentary view in elevation of the heating element of the fuel vaporizer with parts broken away to show its interior packing.

Referring now more particularly to the drawings and especially to Figure 1 thereof, the fuel vaporizer comprising the present invention is there shown embodied in a multiple cylinder, internal combustion engine of the type generally used for furnishing power in an automobile. The engine includes a cylinder block 11, having an intake manifold 12 into which the fuel is introduced by a carburetor 13 for suction into the cylinders. The exhaust gases are discharged from the engine through an exhaust manifold 14.

The intake manifold 12 is provided with a centrally located opening 15 at its top through which the fuel from the carburetor 13 passes into the manifold. The opening 15 is surrounded by an exterior boss 16 formed on the manifold which is provided for receiving a mounting flange 17 of the carburetor 13. Interposed between the mounting flange 17 of the carburetor 13 and the boss 16, is a collar 22 of the same general shape as the mounting flange 17. The collar 22 is provided with two parallel holes 23 spaced in accordance with two similar holes (not shown) formed in the mounting flange 17 of the carburetor 13, so that two bolts (not shown) may be passed through these holes into engagement with mating threads formed in the boss 16, to rigidly secure, both the carburetor 13 and the collar 22 to the boss 16.

The collar 22 serves to support a pair of depending electrodes 24 and 25 which are suspended therefrom by means of a pair of arms 26 and 27. The arms 26 and 27 may be formed integrally with the electrodes 24 and 25 by bending the upper portions of the electrodes ninety degrees outwardly, in opposite directions, so that they may pass through the body of the collar 22 from its central opening to extend beyond the outer edge of the collar. The exterior ends of the arms 26 and 27 are threaded to receive a pair of nuts 28 and 29 which serve to connect the electrodes 24 and 25 in the electrical circuit to be described.

The lower ends of the electrodes 24 and 25 support a heating element or coil 30 between them so that the bottom of the heating element 30 is not more than one quarter of an inch from the floor of the manifold, and preferably closer for maximum efficiency of the unit. The proximity of the heating element 30 to the floor of the manifold is very important, because the gasoline from the carburetor 13 which fails to vaporize falls to the floor of the manifold where it forms a pool. It is essential that the heat be generated in the area of this pool of gasoline so that it may effect its vaporization. If the heating element 30 is located at a substantial distance above the floor of the manifold it will fail to have the proper effect on the gasoline accumulating there.

To further assist in vaporizing the liquid gasoline, the coil 30 is filled with a packing 31 of lamp wick, asbestos, or other similar flame resisting absorbent material, which serves to absorb a portion of the unvaporized gasoline falling from the carburetor 13. This gasoline, being surrounded by the heating element 30, is very readily vaporized to thus substantially increase the quantity of vaporized gasoline available for suction into the cylinders.

As clearly illustrated in Figure 1, the heating element 30 is connected in the electrical circuit of a starting motor 32 which is provided for starting the engine. The electric current for energizing the heating element 30 originates from a storage battery 32 which is of the type normally provided in automobiles for furnishing current for lighting, starting, and electrically operated accessories. From the storage battery 32, the current flows into a conductor 33 to a contact 34 of a normally open starter switch 35. When the switch 35 is closed the current flows through its movable contact arm 36 into a conductor 37 to a terminal 38 of the starting motor 32. A portion of the current from the conductor 37 flows through the motor 32 to energize it and returns to its source through a conductor (not shown) connected to a ground.

The current from the conductor 37 also flows into a conductor 43 which has one end connected to the terminal 38 and the other end to the arm 26, being fastened thereto by the nut 28. From the arm 26 the current continues through the electrode 24 into the heating element 30 to energize it, and returns to its source through the electrode 25, the arm 27, and a conductor 44, which is connected at one end to the arm 27 by means of the nut 29 and at the other end to a ground 45. The current returns to the battery 32 through the ground 45, the battery also having one of its terminals connected thereto.

In this manner, the heating element 30 is connected in parallel with the starting motor 32, and is arranged to be controlled by the same switch 35 which controls the starting motor. Thus when the operator closes the switch 35 for the purpose of energizing the starter motor 32 to turn over the engine to start it, the heating element 30 is also energized by reason of its being connected in the same circuit. As the engine is turned over, the carburetor 13 begins to feed gasoline into the intake manifold 12, and when adverse conditions exist which deter vaporization of the gasoline within the manifold, the liquid gasoline will fall to the floor of the manifold where it is subjected to the heat generated by the heating element 30, which serves to produce its vaporization. The vapor thus obtained is readily drawn into the cylinders where it functions to start the engine.

With this arrangement, the starting of the engine under adverse conditions is facilitated with the utmost efficiency. A minimum amount of current is required to operate the vaporizer because it is operated only when necessary, simultaneously with the operation of the starting motor 32. Once the engine is started the heating element 30 is rendered inoperative, because then the heat from the engine itself is sufficient to produce vaporization of the gasoline, without the need of introducing heat from another source in the intake manifold.

It will be noted that the particular construction illustrated is especially adaptable for installation in existing engines. To accomplish this it is only necessary to remove the carburetor by withdrawing its mounting screws and installing the vaporizer in the intake manifold with its collar 22 in position on the carburetor mounting boss 16. The carburetor may then be replaced and secured with the same mounting screws, which will also serve to hold the collar 22 in position. The vaporizer can then be readily connected into the starting motor electrical circuit as described, and the apparatus is ready for operation.

From the foregoing detailed description of the structure and operation of the illustrative embodiment of the present invention, it will be apparent that a new and improved fuel vaporizer has been provided for installation in the intake manifold of an internal combustion engine, that is especially adaptable for facilitating the starting of an engine subjected to low temperatures, by generating heat in the manifold, in the area where liquid gasoline is most apt to accumulate, for the purpose of producing its vaporization.

Although the illustrative embodiment of the invention has been described in considerable detail for the purpose of making a full disclosure of a practical operative arrangement by means of which the invention may be practiced, it is to be understood that various novel features of the invention may be incorporated in other arrangements without departing from the spirit and scope of the invention as defined in the subjoined claims.

The principles of the invention having now been fully explained in connection with the foregoing description of the illustrative embodiments, the invention is hereby claimed as follows:

1. In a fuel vaporizer for an internal combustion engine having a carburetor for feeding fuel into its intake manifold, a collar secured beneath said carburetor, a pair of electrodes depending from said collar into the intake manifold of said engine, a heating element suspended from the free ends of said electrodes so that its lowermost surface is not more than one quarter of an inch from the floor of said intake manifold, said heating element having electrical connection with said electrodes, a packing of absorbent material disposed in said heating element to absorb liquid fuel striking it, and a source of electrical energy connected to said electrodes for energizing said heating element, whereby said packing will serve to accumulate liquid fuel next to said heating element, which will furnish heat for effecting vaporization of such fuel to facilitate starting of the engine.

2. In a fuel vaporizer for an internal combustion engine having a carburetor for feeding fuel into its intake manifold, an electric heating element mounted in said intake manifold so that its lowermost surface is not more than one quarter of an inch from the floor of said manifold directly beneath the carburetor in the path of the fuel being fed into said manifold from the carburetor, a packing of absorbent material disposed in said heating element to absorb liquid fuel striking it, and a source of electrical energy connected to furnish electric current for energizing said heating element, whereby said packing will serve to accumulate liquid fuel next to said heating element to efficiently produce its vaporization.

3. In a fuel vaporizer for an internal combustion engine, a collar, a pair of electrodes depending from said collar, an electrical heating element suspended from the free ends of said electrodes and having electrical connection therewith, a packing of absorbent material disposed in said heating element to absorb liquid fuel striking it, and a source of electrical energy connected to said electrodes for selectively energizing said heating element, whereby said packing will serve to accumulate liquid fuel next to said heating element, which will furnish heat for effecting vaporization of such fuel to facilitate starting of the engine.

4. In a fuel vaporizer for an internal combustion engine, a collar adapted for insertion between the carburetor and the intake manifold of the engine, a pair of electrodes extending outwardly of said collar, an electrical heating element supported by said electrodes at their ends opposite said collar and having electrical connection therewith, and a source of electrical energy connected to said electrodes for selectively energizing said heating element, whereby said heating element may be selectively energized for producing heat to vaporize fuel within an internal combustion engine.

5. In a fuel vaporizer for an internal combustion engine, a collar, a pair of terminals secured to the periphery of said collar, a pair of electrodes attached to said collar and extending outwardly therefrom, each of said electrodes having electrical connection with one of said terminals, an electrical heating element supported by said electrodes at their ends opposite said collar and having electrical connection therewith, a packing of absorbent material disposed within said heating element to absorb liquid fuel striking it, and a source of electrical energy connected to said terminals for selectively energizing said heating element, whereby upon the application of electrical energy to said terminals, said heating element will be energized to generate heat for vaporizing fuel.

6. In a fuel vaporizer for an internal combustion engine, a collar, a pair of electrodes depending from said collar and having angularly extending upper portions extending through the collar from its inner diameter to protrude beyond its outer diameter, an electrical heating element supported by said electrodes at their ends opposite said collar and having electrical connection therewith, and a source of electrical energy connected to said electrodes at the portions extending beyond the outer diameter of said collar for selectively energizing said heating element, whereby upon the application of electrical energy to said terminals, said heating element will be energized to generate heat for vaporizing fuel.

7. In a fuel vaporizer for an internal combustion engine, a collar, a pair of electrodes depending from said collar, an electric coil heating element supported by the ends of said electrodes opposite the collar and having electrical connection therewith, a packing of absorbent material disposed within the coil of said heating element to absorb liquid fuel striking it, and a source of electrical energy connected to said electrodes for selectively energizing said heating element, whereby upon the application of electrical energy to said electrodes, said heating element will be energized to generate heat for vaporizing fuel.

References Cited in the file of this patent

UNITED STATES PATENTS

| | | |
|---|---|---|
| 971,682 | Low | Oct. 4, 1910 |
| 1,147,416 | MacDonald | July 20, 1915 |
| 1,300,659 | Shelor | Apr. 15, 1919 |
| 1,353,288 | Stokes | Sept. 21, 1920 |
| 1,367,789 | Torres | Feb. 8, 1921 |
| 1,456,018 | Wiegand | May 22, 1923 |
| 1,491,950 | Harrison | Apr. 29, 1924 |
| 1,631,176 | Wirror | June 7, 1927 |
| 1,640,902 | Litle, Jr. | Aug. 30, 1927 |
| 1,959,397 | Turner | May 22, 1934 |
| 2,139,777 | Skok et al. | Dec. 13, 1938 |
| 2,587,713 | Elliott et al. | Mar. 4, 1952 |
| 2,597,251 | Mansoff | May 20, 1952 |
| 2,623,978 | Cantrell | Dec. 30, 1952 |